(12) United States Patent
Kroening, Jr. et al.

(10) Patent No.: US 6,271,517 B1
(45) Date of Patent: Aug. 7, 2001

(54) PET SCANNER POINT SOURCE LOCATOR

(75) Inventors: John W. Kroening, Jr.; Mary A. Park, both of New Berlin, WI (US)

(73) Assignee: General Electric Company, Waukesha, WI (US)

(*) Notice: Subject to any disclaimer, the term of this patent is extended or adjusted under 35 U.S.C. 154(b) by 0 days.

(21) Appl. No.: 09/198,908

(22) Filed: Nov. 24, 1998

(51) Int. Cl.[7] ............................................. G01T 1/164
(52) U.S. Cl. .......................... 250/252.1; 250/363.01; 250/363.09; 250/370.09
(58) Field of Search ........................ 250/252.1, 363.03, 250/363.04, 363.09, 364, 365, 363.01; 378/197, 198, 207

(56) References Cited

U.S. PATENT DOCUMENTS

| | | | |
|---|---|---|---|
| 4,256,960 | * 3/1981 | Snider | 250/252 |
| 5,273,343 | * 12/1993 | Stearns | 250/363.03 |
| 5,638,817 | * 6/1997 | Morgan et al. | 600/425 |
| 5,703,369 | * 12/1997 | Mori | 250/363.03 |
| 5,750,991 | * 5/1998 | Moyers et al. | 250/363.03 |
| 5,969,358 | * 10/1999 | DiFilippo et al. | 250/363.03 |

* cited by examiner

*Primary Examiner*—Constantine Hannaher
*Assistant Examiner*—Albert Gagliardi
(74) *Attorney, Agent, or Firm*—Quarles & Brady, LLP; Christian G. Cabou

(57) ABSTRACT

An apparatus for providing a radiation point source for testing PET scanner detector accuracy in an annular PET scanner which defines a scanning region, the apparatus including a supporter positioned axially adjacent a scanner, a support member which supports a radiation source at a distal end and is moveable between an extended position within the scanning region and a retracted position outside the scanning region and a motivator for rotating the support member about the scanning region when the support member is extended.

10 Claims, 2 Drawing Sheets

PET SCANNER POINT SOURCE LOCATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to nuclear imaging systems and more particularly to an apparatus for providing a point source of radiation to an annular positron emission tomography scanner for checking detector operation.

Positrons are positively charged electrons which are emitted by radio nuclides that have been prepared using a cyclotron or other device. The radio nuclides most often employed in diagnostic imaging are fluorine-18 ($^{18}$F), carbon-11 ($^{11}$C), nitrogen-13 ($^{13}$N), and oxygen-15 ($^{15}$O). Radio nuclides are employed as radioactive tracers called "radiopharmaceuticals" by incorporating them into substances such as glucose or carbon dioxide. One common use for radiopharmaceuticals is in the medical imaging field.

To use a radiopharmaceutical in imaging, the radiopharmaceutical is injected into a patient and accumulates in an organ, vessel or the like, which is to be imaged. It is known that specific radiopharmaceuticals become concentrated within certain organs or, in the case of a vessel, that specific radiopharmaceuticals will not be absorbed by a vessel wall. The process of concentrating often involves processes such as glucose metabolism, fatty acid metabolism and protein synthesis. Hereinafter, in the interest of simplifying this explanation, an organ to be imaged will be referred to generally as an "organ of interest" and prior art and the invention will be described with respect to a hypothetical organ of interest.

After the radiopharmaceutical becomes concentrated within an organ of interest and while the radio nuclides decay, the radio nuclides emit positrons. The positrons travel a very short distance before they encounter an electron and, when the positron encounters an electron, the positron is annihilated and converted into two photons, or gamma rays. This annihilation event is characterized by two features which are pertinent to medical imaging and particularly to medical imaging using photon emission tomography (PET). First, each gamma ray has an energy of essentially 511 keV upon annihilation. Second, the two gamma rays are directed in substantially opposite directions.

In PET imaging, if the general locations of annihilations can be identified in three dimensions, a three dimensional image of an organ of interest can be reconstructed for observation. To detect annihilation locations, a PET scanner is employed. An exemplary PET scanner includes a plurality of detectors and a processor which, among other things, includes coincidence detection circuitry. For the purposes of this explanation it will be assumed that a scanner includes 12,000 detectors which are arranged to form an annular gantry about an imaging area wherein the scanner thickness (i.e. parallel to an imaging axis which passes through the imaging area) is 6 detectors thick. Each time a 511 keV photon impacts a detector, the detector generates an electronic signal or pulse which is provided to the processor coincidence circuitry.

The coincidence circuitry identifies essentially simultaneous pulse pairs which correspond to detectors which are essentially on opposite sides of the imaging area. Thus, a simultaneous pulse pair indicates that an annihilation has occurred on a straight line between an associated pair of detectors. Over an acquisition period of a few minutes millions of annihilations are recorded, each annihilation associated with a unique detector pair. After an acquisition period, recorded annihilation data can be used via any of several different well known back projection procedures to construct the three dimensional image of the organ of interest.

As well known in the PET art the signals generated by a PET detector vary (e.g. typically become less intense) in intensity over the life of the detector and, indeed, at some point each detector reaches a point where the signal generated thereby is insufficient for imaging purposes. As a detectors signal changes, the signal must be compensated to account for the change. To this end, it is important to have some type of system which periodically test each scanner detector to determine detector condition. Once detector condition is determined detector compensation can be modified to compensate for any perceived degradation. In the event that detector condition has deteriorated to the point of being unusable, even when a signal generated thereby is compensated, the detector can be removed and replaced.

Generally, to test a detector, a point radiation source having a known energy level and intensity is placed adjacent a detector face thereby causing the detector to generate an intensity signal. The generated signal is then compared to a desired intensity signal which corresponds to the known energy level and intensity. If the generated signal is different than the desired signal the gain of the generated signal is modified to cause a resulting signal to be equal to the desired signal.

While the general requirements of a detector checking system are relatively simple, the industry has failed to come up with a simple apparatus to facilitate the requirements. For example, one solution has been to provide a tube which forms a tight spiral path, the internal surface of the tube forming a helical channel, the external surface of each tube winding contacting the external surface of an adjacent tube winding such that the tube as a whole defines a cylinder. The cylinder is dimensioned such that the cylinder fits within the imaging area adjacent the PET scanner. The external surface of the cylinder is radio-translucent so that radiation passes therethrough while the internal surface of the cylinder is covered with a radiation blocking material. A point source of radiation is provided inside the tube and some mechanism is provided to control the source position within the tube. For example, the tube may be provided with a liquid source and a pump which can control source position by pumping liquid into and out of the tube. Another system may include a metallic bead string having proximate and distal ends wherein the proximate end is linked to a winder for winding and unwinding the string and the distal end is linked to the point source. When the string is unwound the source is forced along the tube in a first direction and when the string is would the tube source is pulled within the tube in a second direction opposite the first.

In operation, to use the tube to assess detector accuracy, the cylinder is placed inside the imaging area so that the center of the tube is concentric with the imaging axis. The point source is placed within the tube and the movement mechanism (e.g. liquid or metallic string) is controlled to cause placement of the source adjacent detectors. Where the tube has a relatively minimal girth the source can be placed in front of any of the detectors to assess detector operation.

While these solutions for providing a detector source have proven useful, these solutions have a number of shortcomings. First, the tube configuration is relatively hardware intensive and therefore is also relatively expensive.

Second, the time required to position a source adjacent a specific detector is excessive considering the task to be accomplished. For example, where a detector to be examined is positioned axially distant from the proximate end of the tube, to examine the detector these types of systems would require a user to align the cylinder within the imaging area and then cause the source to pass through potentially the entire tube to reach the axially distant detector position. This is extremely time consuming. In addition, between detector examinations and during imaging sessions, the cylinder must be removed from the imaging area so that the detectors can be used for regular emission imaging. While cylinder removal can be relatively quick, cylinder replacement and alignment within the imaging area must be extremely accurate to ensure that specific sections of the tube are adjacent specific detectors. This alignment process can be time consuming and therefore acts as a barrier to frequent detector testing.

Third, there are some concerns about point source position accuracy with these types of systems. For example, if there is some slack in a metallic string or some liquid passes a point source within the tube, position accuracy can suffer.

Fourth, because tube girth has to be relatively minimal tube manufacturing tolerances are extremely tight which further increases the costs of tube-type systems.

Another solution to provide a source for testing detector accuracy has been to build a light source of known intensity into each detector. In this case, to determine accuracy of a specific detector the detector source is turned on and a detector signal is generated for comparison to a desired signal. While this solution is fast and accurate, detectors with built in sources are relatively expensive and therefore cost prohibitive. In addition, existing systems cannot usually be retrofitted to accommodate such detectors.

BRIEF SUMMARY OF THE INVENTION

An exemplary embodiment of the invention includes an assembly for axially positioning a point source in front of a PET scanner for the purpose of transmission scanning, the scanner including a plurality of detectors arranged to form an annular cylinder about a cylindrical scanning region centered on a scanning axis. The assembly comprises a supporter positioned axially adjacent the scanning region, a support member having a distal end for supporting a point source, the support member moveable between at least a retracted position wherein the distal end is positioned axially adjacent and outside the scanning region and an extended position wherein the distal end is positioned within the scanning region, and a motivator linked to the supporter and for, when the support member is in the extended position, rotating the support member about the scanning axis.

In one embodiment the motivator may be a first motivator and the assembly may further include a second motivator mounted to the supporter and linked to the support member for moving the distal end between the retracted and extended positions.

The inventive construction has a number of advantages. In particular, the inventive construction provides a point source which can be moved to positions adjacent virtually any PET detector in a scanner for test purposes. In addition, when the source is not needed the source can be removed from the scanner scanning region so as not to impede normal scanner operations. Moreover, the source can be rotated about the periphery of the scanning region adjacent detectors to identify operating characteristics of all detectors if desired. Furthermore, the inventive construction is simple to build and control and is therefore relatively inexpensive.

DETAILED DESCRIPTION OF THE INVENTION

I. HARDWARE

Figure 1:
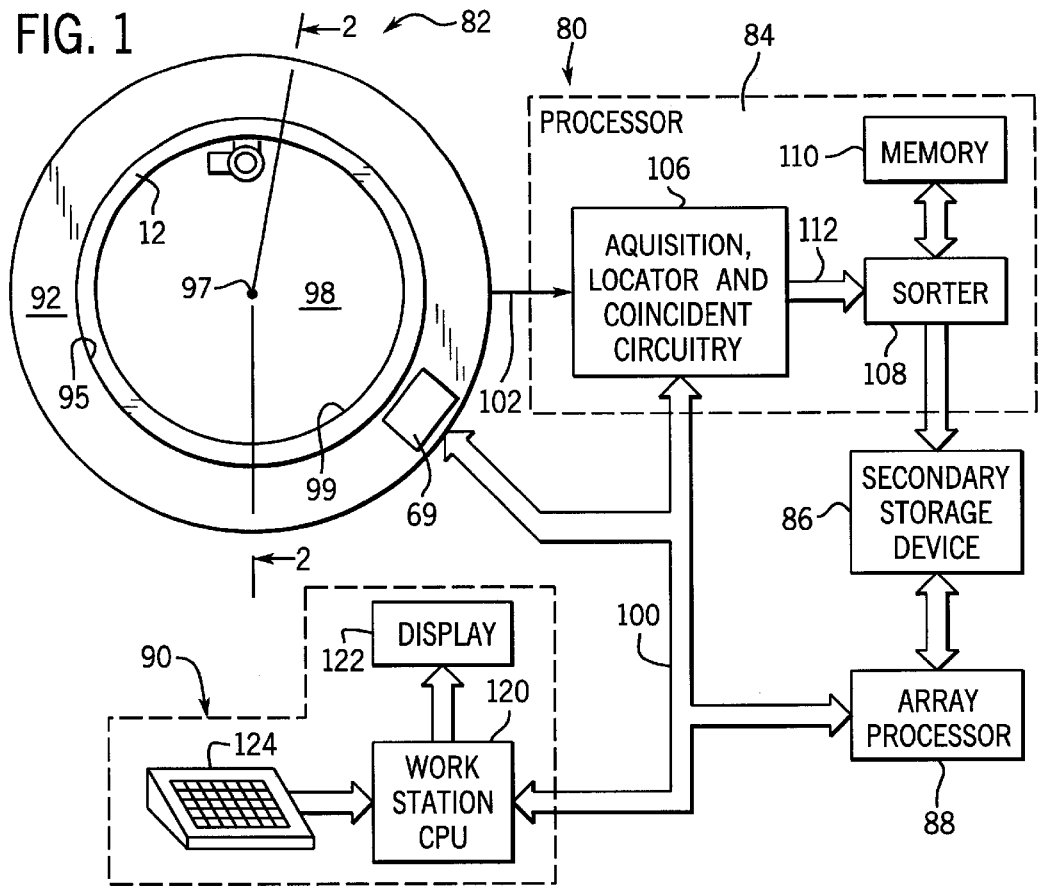
FIG. 1 is a schematic view of a PET acquisition system including the present invention.

Referring now to the drawings, wherein like reference characters and symbols represent corresponding elements and signals throughout the several views, and more specifically referring to FIG. 1, the present invention will be described in the context of an exemplary PET scanner system 80. System 80 includes an acquisition system 82, an operator work station 90, a data acquisition processor 84, a secondary storage device 86 and an array processor 88.

Figure 2:
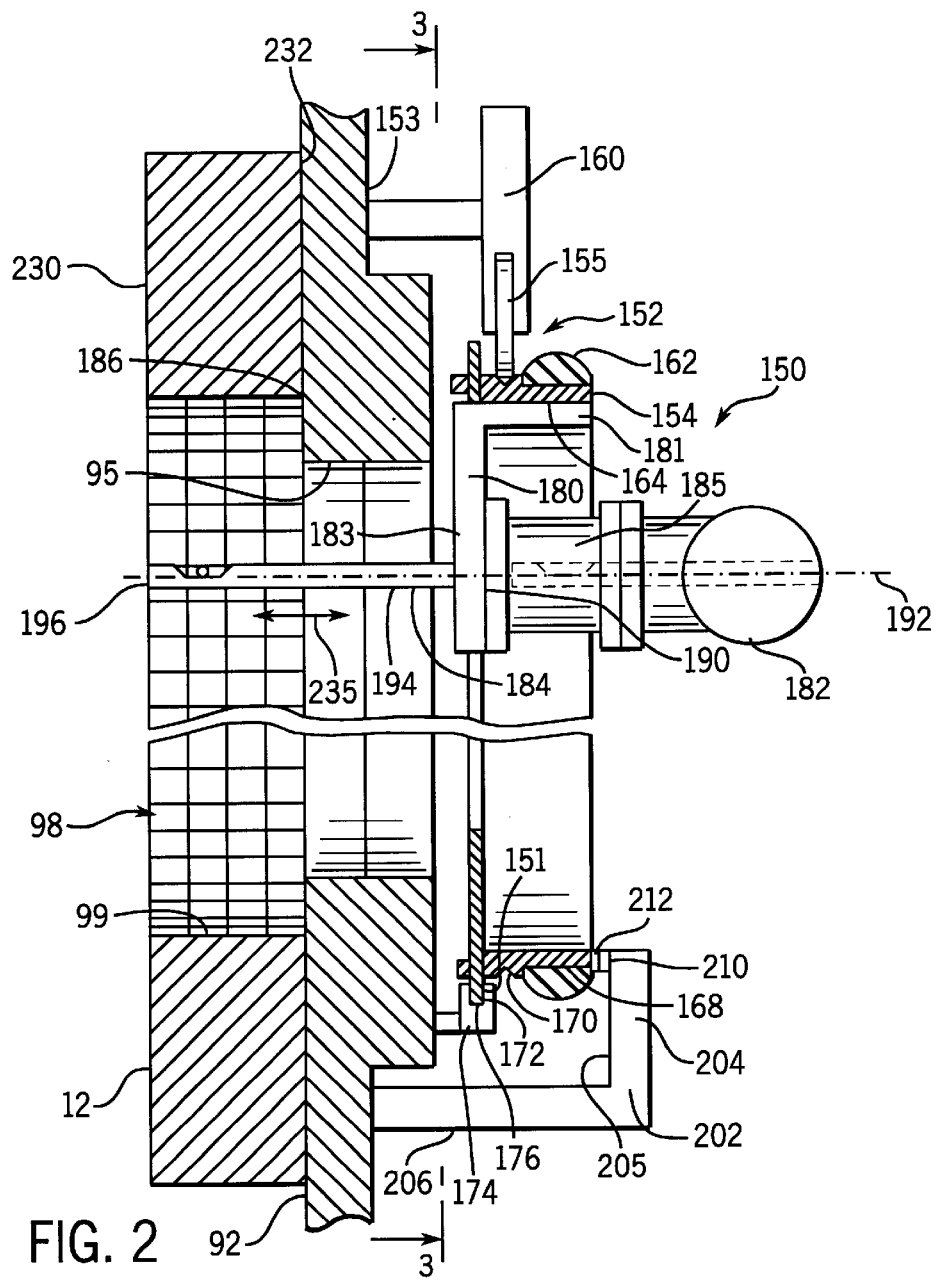
FIG. 2 is a cross-sectional view taken along the line 2—2 of FIG. 2.

System 82 includes some type of supporter, preferably a gantry 92 which forms a gantry bore 95, which supports a PET scanner 12 about a central scanning axis 97 which passes through a cylindrical scanning region 98. Referring also to FIG. 2, scanner 12 includes a large number (e.g. thousands) of PET detectors which are arranged on an internal annular surface 99 of the scanner between front and rear scanner edges 230, 232, respectively, which bound region 98. Each detector is configured for detecting gamma rays which emanate from within region 98. Construction and operation of an exemplary PET scanner 12 is described in detail in U.S. Pat. No. 5,272,343 which issued on Dec. 21, 1993 and is entitled "Sorter for Coincidence Timing Calibration in PET Scanner" and which is incorporated herein by reference. Scanner 12 generates analog signals when a gamma ray is detected. The analog signals are provided to processor 84 via a data bus 102.

A patient table (not illustrated) is positioned in front of gantry 92 and is aligned with scanning region 98. A patient table controller (also not illustrated) moves a table bed into region 98 typically along axis 97 in response to commands received from work station 90.

A gantry controller 69 is mounted within gantry 92 and is responsive to commands received from operator work station 90 through a serial communication link 100 to operate gantry 92. For example, gantry 92 can be tilted away from vertical on command from an operator, can perform a "transmission scan" with a calibrated radio nuclide source to acquire attenuation measurements, can perform a "coincidence timing calibration scan" to acquire corrective data, or can perform a normal "emission scan" in which positron annihilation events are counted.

Processor 84 includes acquisition, event locator and coincident (ALC) circuitry 106, a sorter 108 and a processor memory 110. ALC circuitry 106 receives the analog signals via bus 102 and perform several different functions. First, ALC circuitry 106 identifies the total energy associated with a perceived event and compares the total energy to an expected range of energies corresponding to a likely true annihilation event. To this end, the expected energy range of a true annihilation event is typically 511 keV±20%. ALC circuitry 106 discards perceived events which are outside the expected range.

Second, ALC circuitry 106 determines the location on the impact surface of scanner at which a gamma ray is detected and the exact time at which a gamma ray is detected. Methods to determine impact location and time are well known in the PET imaging art.

Third, ALC circuitry 106 determines if any two events (i.e. detected gamma rays) are in coincidence. Coincidence is determined by a number of factors. First, the time markers in each event data packet must be within 12.5 nanoseconds of each other, and second, the locations indicated by the two event data packets must lie on a straight line which passes through the field of view (FOV) in scanning region 98. Events which cannot be paired as coincidence events are discarded, but coincidence event pairs are located and recorded as a coincidence data packet that is conveyed through a serial link 112 to sorter 108. Each coincidence data packet includes a pair of digital numbers which precisely identify the locations of coincident events scanner 12. The primary purpose of sorter 34 is to efficiently store coincidence data packets thereby reducing required processor memory while maintaining data integrity. During a data acquisition, the coincidence counts (e.g. there is a separate coincidence count for each projection ray (R,2θ) are organized in memory 110. After an acquisition session has been completed, array processor 88 reconstructs an image from the coincident count data in memory 110. The image array can then be accessed for viewing via work station 90.

Station 90 includes a CPU 120, a CRT display 122 and a keyboard 124. CPU 120 connects to network 100 and scans key board 124 for input information. Through keyboard 124, network 100 and associated control panel switches, an operator can control calibration of system 82, its configuration, and the positioning of the patient table during an acquisition period.

Figure 3:
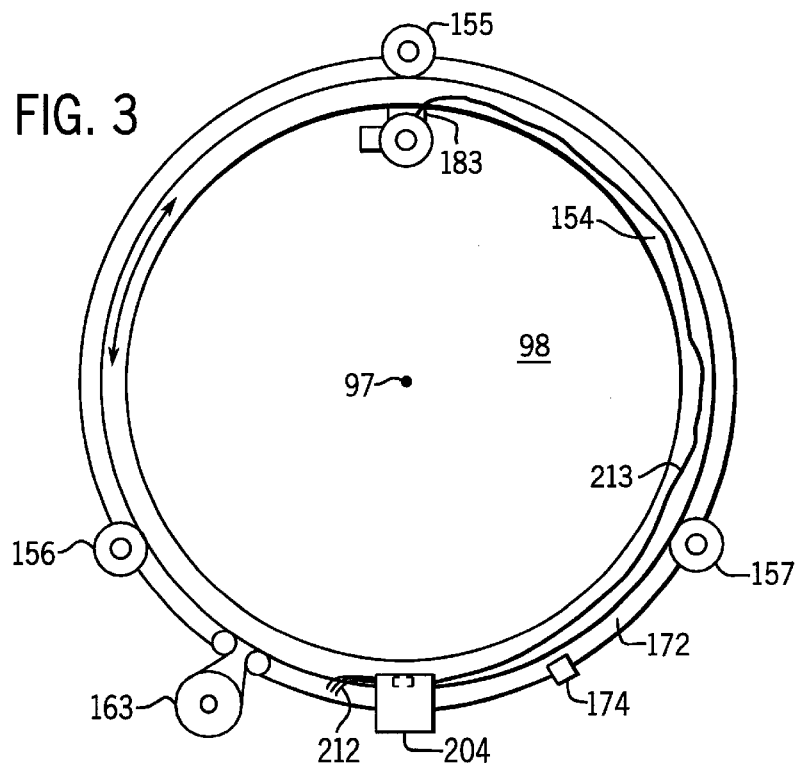
FIG. 3 is a view taken along the line 3—3 of FIG. 2.

All of the hardware described above is conventional. According to the present invention a point source locator/motivator is added to the hardware described above for providing a point radiation source adjacent scanner 12 for assessing operating characteristics of detectors within scanner 12. To this end, referring to FIGS. 1, 2 and 3, system 82 also includes a point source assembly which comprises an axial position assembly 150 and a radial motivator 152. Radial motivator 152 includes at least three support wheels 155,156 and 157, a supporter in the form of a rotating member(e.g. a ring) 154, a motivating belt 162 and a motivator, typically in the form of a motor 163. Wheels 155,156 and 157 may be mounted to a rear surface 153 of gantry 92 so as to be equispaced about imaging area 98 and so that each wheel rotates about an axis which is parallel to scanning axis 97. Preferably wheels 155,156 and 157 are mounted using posts like post 160 (see FIG. 2).

Rotating member 154 is annular and forms an internal surface 164 which has essentially the same dimensions as detector surface 99. An external surface 168 of member 154 forms a wheel receiving grove 170 which is configured so as to receive each of wheels 155, 156 and 157 when member 154 is mounted therebetween. Motor 163 is positioned adjacent member 154. Motivating belt 162 is mounted to motor 163 and wraps around external surface 168 of member 154 such that when a shaft of motor 163 rotates motion is similarly imparted to rotating member 154.

In addition, to monitor the rotational position of rotating member 154 at all times a rotation position tracking system is also provided. To this end, referring to FIGS. 2 and 3, an encoder ring 172 and encoder pickup head 174 are provided. Like rotating member 154, ring 172 is similarly annularly shaped, ring 172 being mounted to member 154 for rotation therewith. A distal end 176 of ring 172 extends radially past external surface 168. Some type of discontinuity is provided adjacent distal end 176 which can be detected by head 174. For example, a sequence of markings, apertures, light reflectors or magnets may be provided adjacent the distal end 176.

Head 174 forms a ring receiving groove 151 and is secured to rear surface 153 such that when rotating member 154 is supported by wheels 155, 156 and 157, ring distal end 176 is received within groove 151. Although not illustrated, a sensor is provided within groove 151 for sensing the discontinuities adjacent the distal end 176 of ring 172. After the discontinuities are detected a processor uses the discontinuity pattern to identify member 154 position in any manner which is known in the art.

Axial position assembly 150 includes a mounting bracket 180, another motivator, preferably a motor 182, a support member 184 and a radiation shield 185. Bracket 180 has an "L" shape having first and second members 181 and 183. Member 181 is mounted in any manner to the internal surface 164 of rotating member 154 so that member 183 extends radially inward toward axis 97 and a first surface 186 faces scanner 12. Preferably member 181 is releasably mounted to surface 164 so that assembly 150 can be removed from rotating member 154 when not in use. For example, member 181 may be bolted to member 154.

Shield 185 is cylindrical, is formed of any radiation absorbing material and is mounted to a second surface 190 of member 183 opposite first surface 186.

Motor 182 is mounted to a distal end of shield 185 opposite member 183 and provides a rotating shaft which extends along an axis 192 which is parallel to scanning axis 97.

Figure 4:
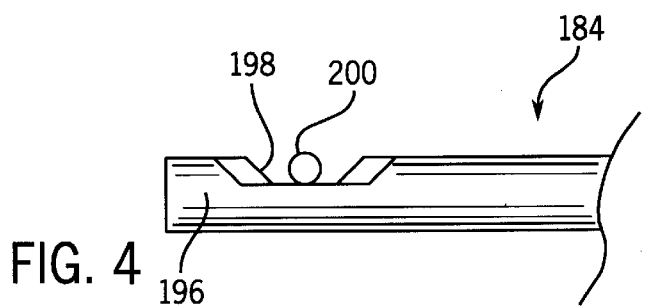
FIG. 4 is an enlarged view of the distal end of the support member of FIG. 2.

Support member 184 is an elongated screw member which includes a proximate end 194 mounted to the motor shaft for rotation therewith and a distal end 196 which extends along axis 192. Referring also to FIG. 4, distal end 196 forms a source receiving bay 198 which is configured to securely receive and retain a radiation point source 200. Although not illustrated, any mechanism for securing source 200 can be used. For example, a simple radio translucent cover may be placed over bay 198 after source 200 is deposited therein.

As illustrated in FIG. 2, motor 182 can be controlled to drive support member 184 to any position within a range between an extended position (generally illustrated) wherein source 200 is adjacent any axial portion of scanner 12 and a retracted position (shown in phantom) wherein source 200 is within shield 185 and outside scanning region 98.

Some mechanism is required to provide commands to motor 182 for moving support member 184 along axis 192. To this end a preferred embodiment of the invention includes a brush/contact assembly which comprises a second bracket 202, a first contact 210, a second contact 212 and a linking cable 213. Bracket 202, like bracket 180, is "L" shaped having first and second members 204 and 206, respectively. Member 206 is secured to rear surface 153 and extends lengthwise therefrom parallel to axis 97, member 204 extending radially inwardly from a distal end thereof. Contact 210 is mounted to a surface 205 of member 204 adjacent member 154. Second contact 212 is preferably a brush 212 which is mounted to rotating member 154 adjacent member 204 and is electrically linked to assembly 150 via cable 213.

Typically member 154 clears contact 210. However, when brush 212 is adjacent contact 210, brush 212 and contact 210 form an electrical contact and commands can be provided to assembly 150 (i.e. motor 182) via contact 212 and cable 213.

II. OPERATION

Referring to FIGS. 1 through 4, in order to test a scanner detector to determine the detectors accuracy, an operator first provides a suitable radiation point source 200 within bay 198. Then, assuming support member 184 is initially parked in the retracted position (see phantom in FIG. 2) and also assuming rotating member 154 is positioned such that brush 212 contacts contact 210, the operator uses work station 90 to provide commands to motor 182 indicating the required orientation of source 200 with respect to scanner 12 within scanning region 98. To this end the proper axial position is achieved when bay 198 is in the same position with respect to front scanner edge 230 as the detector to be checked. In response to the command signals motor 182 rotates its shaft a specific number of turns which is known to cause bay 198 to assume the commanded axial position.

Thereafter, the operator uses station 90 to provide rotational commands to motor 163. For example, assuming that the detector to be tested is not currently radially aligned with bay 198, in this case rotating member 154 has to be rotated until bay 198 is aligned with the detector to be tested. To this end control signals are provided to motor 163 indicating the proper amount of rotation to facilitate radial alignment.

Once the commanded axial and radial positions are assumed, a testing acquisition period can commence wherein scanner 12 is used to collect gamma rays via the detector to be tested. Thereafter the collected scanner information can be compared by a processor to a range of known correct information to determine the accuracy of the tested detector.

Where more than a single detector is to be tested for accuracy, bay 198 can be moved to other suitable locations with respect to scanner 12. For example, where every detector within scanner 12 is to be tested, initially bay 198 may be positioned proximate front edge 230. With bay 198 so positioned rotating member 154 can be rotated about axis 97 through a full rotation while data is collected for each of the detectors instantaneously adjacent bay 198. Thereafter, once contact 210 and brush 212 again make contact, member 184 can be moved radially along the direction indicated by arrow 235 toward shield 185 until bay 198 is aligned with the next set of scanner detectors. Again, while rotating source 200 data can be collected for the next set of detectors. This process is continued until all data has been collected for all detectors. After all required data has been detected support member 184 is drawn back into the retracted position within shield 185 where radiation is absorbed by the shield and member 184 is outside region 98.

Thus, it should be appreciated that the present invention provides a simple apparatus for providing a radiation point source for testing PET detector accuracy. Using the present invention it is easy to accurately align source 200 with any of the many different detectors on an annular scanner. In addition, the source can be moved about the scanning region in a controlled fashion to position the source anywhere with respect to the detectors. Moreover, when not being used to generate accuracy information the source and support member can be removed completely from the scanning region and if necessary, the source and other hardware can be removed from the system entirely to ensure that the hardware does not interfere with a patient or table being transferred through the scanning region. Furthermore, to minimize the cost of providing control signals to the axially moving assembly (i.e. 150), the preferred embodiment restricts signal communication to a single position of rotating member 154.

While the invention is described as one wherein a gantry is used to support the point source, other support mechanisms could be used. For example, a multi-articulate arm which can rotate a distal end in an annular path could be used instead of a gantry. In this case the arm and source would be positioned adjacent a scanner and aligned prior to test acquisition. In addition, while the invention is described as one wherein commands can be provided to the axial assembly (i.e. 150) only when rotating member 154 is in a single position, clearly other communicating systems are also contemplated including a system wherein electronic contact can be facilitated at all times, contact can be facilitated at more than one location and wherein commands can be transmitted to assembly 150 in other manners. For example, assembly 150 may be battery powered and may be equipped with an infra-red receiver for receiving commands in any radial position.

In addition, the inventive system can be used to facilitate other acquisition types. For example, instead of providing bay 198 adjacent specific detectors, bay 198 may be positioned adjacent a central detector band (i.e. in FIG. 2, half way between edges 230 and 232) and acquisition via all scanner detectors may be performed as bay 198 is rotated through a single rotation about region 98 for a rough estimate of detector accuracy throughout scanner 12. Moreover, while a motivator is provided in the preferred embodiment to move the bay axially with respect to the scanning region, other manual means to facilitate such movement are also contemplated.

To apprise the public of the scope of this invention, we make the following claims:

What is claimed is:

1. An assembly for axially positioning a point source in front of a PET scanner for the purpose of transmission scanning, the scanner including a plurality of detectors arranged to form an annular cylinder about a cylindrical scanning region centered on a scanning axis, the assembly comprising:

an annular rotating member positioned axially adjacent the scanning region and coaxially with the scanner;

a support member having a distal end for supporting a point source, the support member moveable between at least a retracted position wherein the distal end is positioned axially adjacent and outside the scanning region and an extended position wherein the distal end is positioned within the scanning region;

a first motivator linked to the annular member;

a second motivator secured to the annular member for rotation therewith and linked to the support member for moving the distal end between the retracted and extended positions wherein, when the support member is in the extended position, the first motivator causes the annular member and second motivator secured thereto to rotate about the scanner axis; and first and second contacts, the first contact linked to the second motivator, as the annular member rotates about the scanning axis, the first contact sweeps through a path, the second contact stationary and adjacent the path and, when juxtaposed proximate the first contact, capable of transmitting control signals to the first contact for controlling the second motivator.

2. The assembly of claim 1 wherein the second contact also provides power to the second motivator via the first contact when the first and second contacts are proximately juxtaposed.

3. The assembly of claim 2 wherein the first and second contacts touch when proximately juxtaposed.

4. The assembly of claim 1 also including an annular gantry and wherein the scanner is mounted to the gantry.

5. The assembly of claim 1 also including a shielder which, when the support member is in the retracted position, surrounds the distal end and absorbs radiation and, when the support member is in the extended position, remains adjacent and outside the scanning region.

6. The assembly of claim 1 wherein the support member can be driven to any of several different positions between the retracted and extended positions.

7. The assembly of claim 6 wherein the support member includes a screw which is driven between positions by rotating the screw.

8. The assembly of claim 1 also including a sensor for sensing the radial position of the support member.

9. The assembly of claim 1 also including a sensor for sensing the radial position of the support member, the sensor including an annular encoder ring and an encoder detector, the ring mounted to the annular member for rotation therewith within a second path, the encoder detector positioned proximate the second path for detecting ring movement.

10. The assembly of claim 1 wherein each of the first and second motivaters includes a motor.

* * * * *